(12) United States Patent
Loughran et al.

(10) Patent No.: US 6,539,239 B1
(45) Date of Patent: Mar. 25, 2003

(54) WIRELESS TELECOMMUNICATIONS SYSTEM ARCHITECTURE SUPPORTING RECEIVE DIVERSITY

(75) Inventors: Kevin Loughran, Randolph, NJ (US); Christopher Francis Zappala, Whitehouse Station, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 605 days.

(21) Appl. No.: 09/023,469

(22) Filed: Feb. 13, 1998

(51) Int. Cl.[7] .................................. H04B 1/38
(52) U.S. Cl. ........................ 455/560; 455/562
(58) Field of Search ..................... 455/562, 561, 455/560, 101, 102, 103, 104, 131, 132, 137, 272, 273, 504; 370/319, 334, 344

(56) References Cited

U.S. PATENT DOCUMENTS

| | | | | |
|---|---|---|---|---|
| 3,750,020 A | * | 7/1973 | Baba et al. | 455/523 |
| 5,504,936 A | * | 4/1996 | Lee | 455/562 |
| 5,533,011 A | | 7/1996 | Dean et al. | |
| 5,680,438 A | | 10/1997 | Beesley | |
| 5,799,252 A | * | 8/1998 | Nakagoshi et al. | 455/524 |

FOREIGN PATENT DOCUMENTS

| | | |
|---|---|---|
| EP | 0 685 973 A2 | 12/1995 |
| EP | 0 762 670 A2 | 12/1997 |
| JP | 55-143854 | 11/1980 |
| WO | WO 97/18683 | 5/1997 |

OTHER PUBLICATIONS

B.L. Cyr et al, "Wireless In–Building Services and Architectures," Bell Labs Technical Journal, vo. 3, No. 1, 1998, pp. 30–38. *p. 33, left–hand column, line 28 to p. 34, left–hand col., line 17* .
Hang–Woo Jung et al., "RF Design Technique of CDMA Mobile Communication System", Magazine of Institute of Electronics Engineers of Korea, vol. 21, Jan. 1, 1994— English Translation Provided with relevant cited by Korean Patent Office in corresponding co–pending Korean Application.

* cited by examiner

Primary Examiner—Lee Nguyen
(74) Attorney, Agent, or Firm—DeMont & Breyer, LLC

(57) ABSTRACT

A technique for achieving receive diversity without multiple antennas per cell is disclosed. An illustrative embodiment of the present invention comprises: a first antenna for receiving a first information-bearing signal at a first radio frequency; a first downconverter for downconverting the first information-bearing signal to a first intermediate frequency; a first transmitter for transmitting the first information-bearing signal at the first intermediate frequency over a first wireline; means for receiving the first information-bearing signal at the first intermediate frequency from the first wireline and for demodulating the first information-bearing signal.

18 Claims, 5 Drawing Sheets

100

WIRELESS TELECOMMUNICATIONS SYSTEM ARCHITECTURE SUPPORTING RECEIVE DIVERSITY

FIELD OF THE INVENTION

The present invention relates to telecommunications in general, and, more particularly, to an architecture for a wireless telecommunications system.

BACKGROUND OF THE INVENTION

FIG. 1 depicts a schematic diagram of a portion of a typical wireless telecommunications system in the prior art, which system provides wireless telecommunications service to a number of wireless terminals (e.g., wireless terminals 101-1 through 101-3) that are situated within a geographic region. The heart of a typical wireless telecommunications system is Wireless Switching Center ("WSC") 120, which may also be known as a Mobile Switching Center ("MSC") or a Mobile Telephone Switching Office ("MTSO"). Typically, Wireless Switching Center 120 is connected to a plurality of base stations (e.g., base stations 103-1 through 103-5) that are dispersed throughout the geographic area serviced by the system and to local and long-distance telephone and data networks (e.g., local-office 130, local-office 138 and toll-office 140). Wireless Switching Center 120 is responsible for, among other things, establishing and maintaining calls between wireless terminals and between a wireless terminal and a wireline terminal (e.g., wireline terminal 150), which is connected to the system via the local and/or long-distance networks.

The geographic area serviced by a wireless telecommunications system is partitioned into a number of spatially distinct areas called "cells." As depicted in FIG. 1, each cell is schematically represented by a hexagon; in practice, however, each cell usually has an irregular shape that depends on the topography of the terrain serviced by the system. Typically, each cell contains a base station, which comprises the radios and antennas that the base station uses to communicate with the wireless terminals in that cell and also comprises the transmission equipment that the base station uses to communicate with Wireless Switching Center 120.

For example, when wireless terminal 101-1 desires to communicate with wireless terminal 101-2, wireless terminal 101-1 transmits the desired information to base station 103-1, which relays the information to Wireless Switching Center 120 via wireline 102-1. Upon receipt of the information, and with the knowledge that it is intended for wireless terminal 104-2, Wireless Switching Center 120 then returns the information back to base station 103-1, which relays the information, via radio, to wireless terminal 101-2.

When wireless telecommunications system 100 is a terrestrial system, in contrast to a satellitebased system, the quality and availability of service is subject to the idiosyncrasies of the terrain surrounding the system. For example, when the topography of the terrain is mountainous, or when buildings or trees are present, then signals transmitted by a wireless terminal can arrive at an antenna at the base station both directly and reflected off of objects in the vicinity of the base station. If two or more signals (e.g., one direct path signal and one or more reflected signals, two or more reflected signals, etc.) arrive at the antenna out of phase, then the signals can destructively interfere, which hinders the base station's ability to acquire and process the signal. This phenomenon is known as multipath fading. Empirically, multipath fading is a highly localized phenomena such that if multipath fading occurs at one location, it is highly unlikely to occur at a location just a short distance away.

FIG. 2 depicts a block diagram of a typical base station in the prior art, which typically contains two receive antennas, $Rx_1$ and $Rx_2$, that are configured to serve the same geographic area and to capture variations of the same information-bearing signal. When the two antennas are positioned close to each other (e.g., within ½ wavelength of the information-bearing signal of each other), then it is likely that both antennas will capture variations of the information-bearing signal that have a similar signal strength. For example, if one of the antennas receives a variation of the information-bearing signal that is weak due to multipath fading, then it is likely that the other antenna will also receive a variation of the information-bearing signal that is weak.

In contrast, if the two antennas are positioned far from each other (e.g., more than several wavelengths of the information-bearing signal from each other), then it is unlikely that both antennas will capture variations of the information-bearing signal that have a similar signal strength. In other words, it is unlikely that both antennas will, at the same time, capture variations of the information-bearing signal that are weak because of multipath fading. Therefore, it is for this reason that many base stations employ two or more receive antennas to ensure that at least one variation of the information-bearing signal is captured that is strong and available for processing. The technique for employing N receive antennas to provide robustness in receiving information-bearing signals is known as N-way receive diversity.

When a base station employs N-way receive diversity, the base station incorporates an apparatus known as a diversity combiner to combine the variations of the demodulated information-bearing signal to create an estimate of the information-bearing signal that is better than the estimate that could be made if only one antenna was used. As is well-known in the prior art, the diversity combiner can use a variety of techniques (e.g., traditional selection diversity, equal-gain combining diversity, maximum-ratio combining diversity, etc.) to process the N variations of the information-bearing signals.

The principal disadvantages of a base station architecture that supports N-way receive diversity is that it substantially increases the cost and size of the base station by requiring N receive antennas, N radios for each information-bearing signal to be demodulated, and a diversity combiner in each base station. Furthermore, while the added cost is often justified in macrocellular systems in which a single base station services hundreds of wireless terminals, the added cost is typically prohibitive for indoor and microcellular systems. And, still furthermore, the added radios and diversity combiner in each base station only adds to the amount of equipment that can break-down in a base station and require expensive service calls.

Therefore, the need exists for a wireless telecommunications system architecture that provides the robustness associated with N-way receive diversity; techniques without the costs and disadvantages associated with solutions in the prior art.

SUMMARY OF THE INVENTION

The present invention is a wireless telecommunications system that provides the robustness associated with N-way receive diversity without some of the costs and disadvantages associated with techniques in the prior art. In particular, some embodiments of the present invention are capable of achieving the advantages of receive diversity with one receive antenna per cell, without multiple radios per cell and without a diversity combiner in each cell. This is advantageous because it greatly reduces the cost and complexity of a wireless telecommunications system.

Furthermore, some embodiments of the present invention are capable of allowing two or more receive antennas to share a single wireline, which can reduce the amount of cabling necessary to interconnect the various elements of the wireless telecommunications system.

And still furthermore, some embodiments of the present invention are capable of interconnecting the various elements of the system with inexpensive and easily-installed wireline (e.g., twisted-pair, etc.) in contrast to co-axial cabling.

In an illustrative embodiment of the present invention, the functionality performed by multiple base stations in the prior art is performed by multiple, geographically-dispersed radio heads and a shared, centralized baseband unit. Typically, each radio head comprises one receive antenna and the baseband unit comprises the equipment for demodulating and diversity combining the various information-bearing signals received by the radio heads.

Each radio head captures all of the radio-frequency information-bearing signals transmitted from the wireless terminals within a cell, downconverts them to intermediate frequencies, without demodulating them, and transmits them to the baseband unit. The baseband unit channel decodes, demodulates, demultiplexes, and combines the information-bearing signals to produce the respective traffic channels.

When a wireless terminal is located near a radio head, the information-bearing signal from that wireless terminal is typically received with sufficient power to be adequately received even if the receive antenna is in a fade when the signal is received. In contrast, when a wireless terminal is located near the boundary of a cell, the information-bearing signal from that wireless terminal is typically received by receive antennas at two or more adjacent radio heads. In this case, each radio head transmits its captured version of the information-bearing signal to the baseband unit, which having multiple versions of the information-bearing signal is capable of performs diversity combining on the versions.

An illustrative embodiment of the present invention comprises: a first antenna for receiving a first information-bearing signal at a first radio frequency; a first downconverter for downconverting the first information-bearing signal to a first intermediate frequency; a first transmitter for transmitting the first information-bearing signal at the first intermediate frequency over a first wireline; means for receiving the first information-bearing signal at the first intermediate frequency from the first wireline and for demodulating the first information-bearing signal.

DETAILED DESCRIPTION

Figure 1:
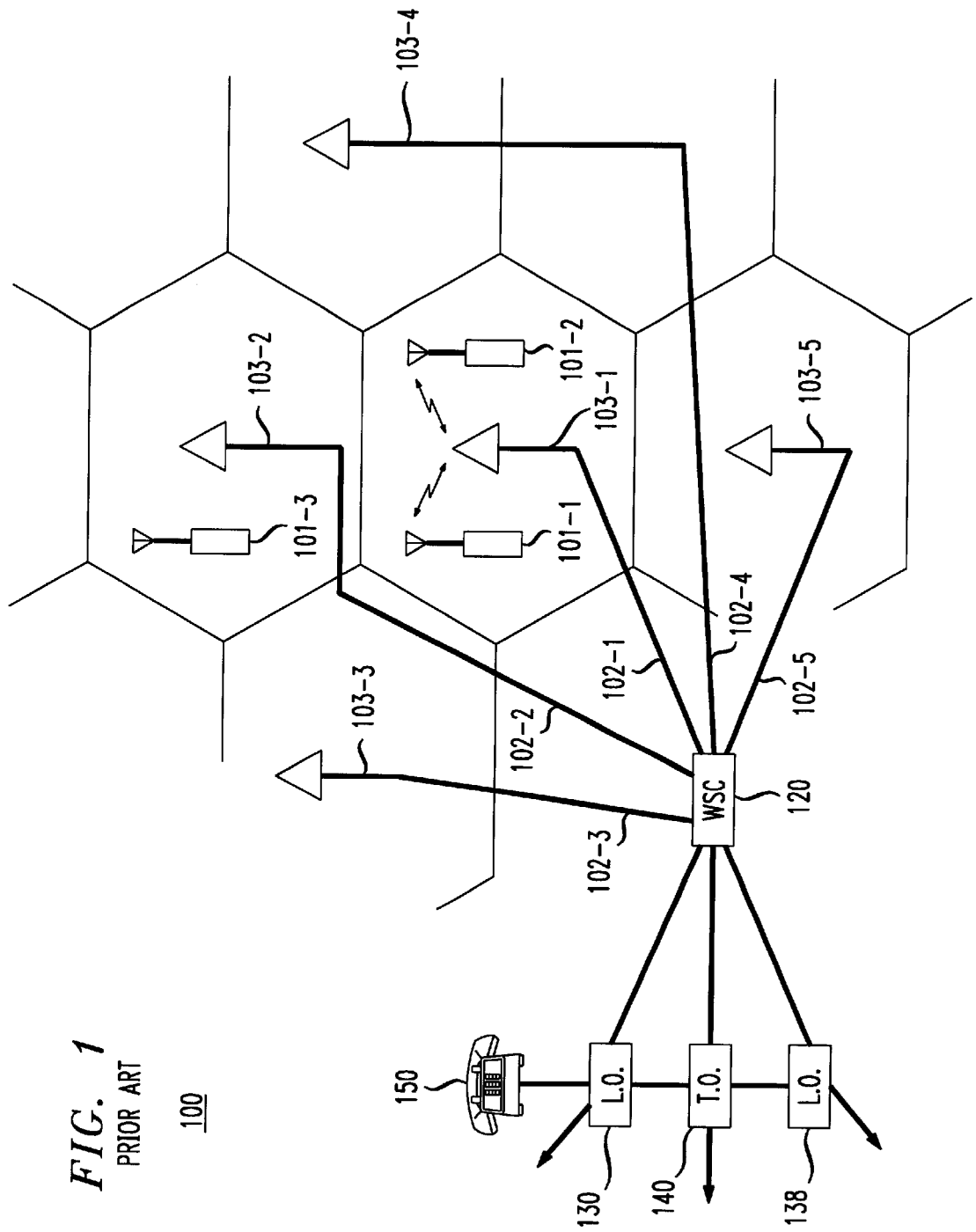
FIG. 1 depicts a schematic diagram of a wireless telecommunications system in the prior art.
Figure 2:
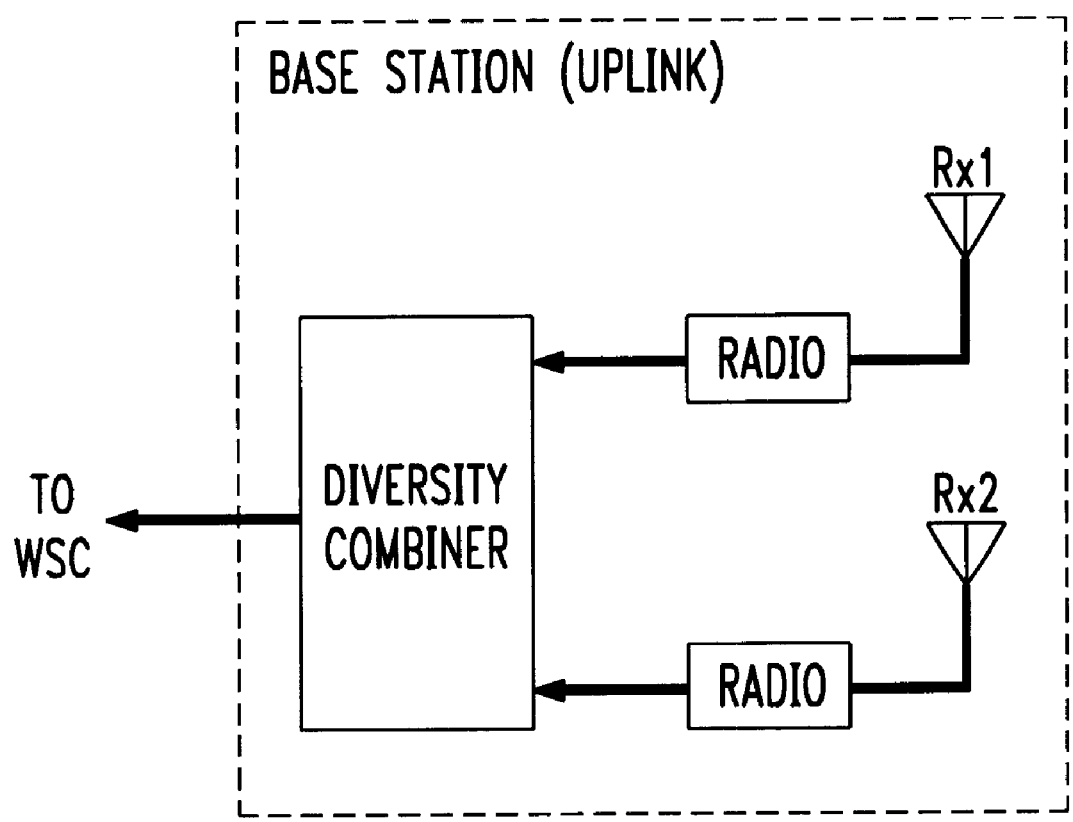
FIG. 2 depicts a block diagram of a base station in the prior art that employs receive diversity.
Figure 3:
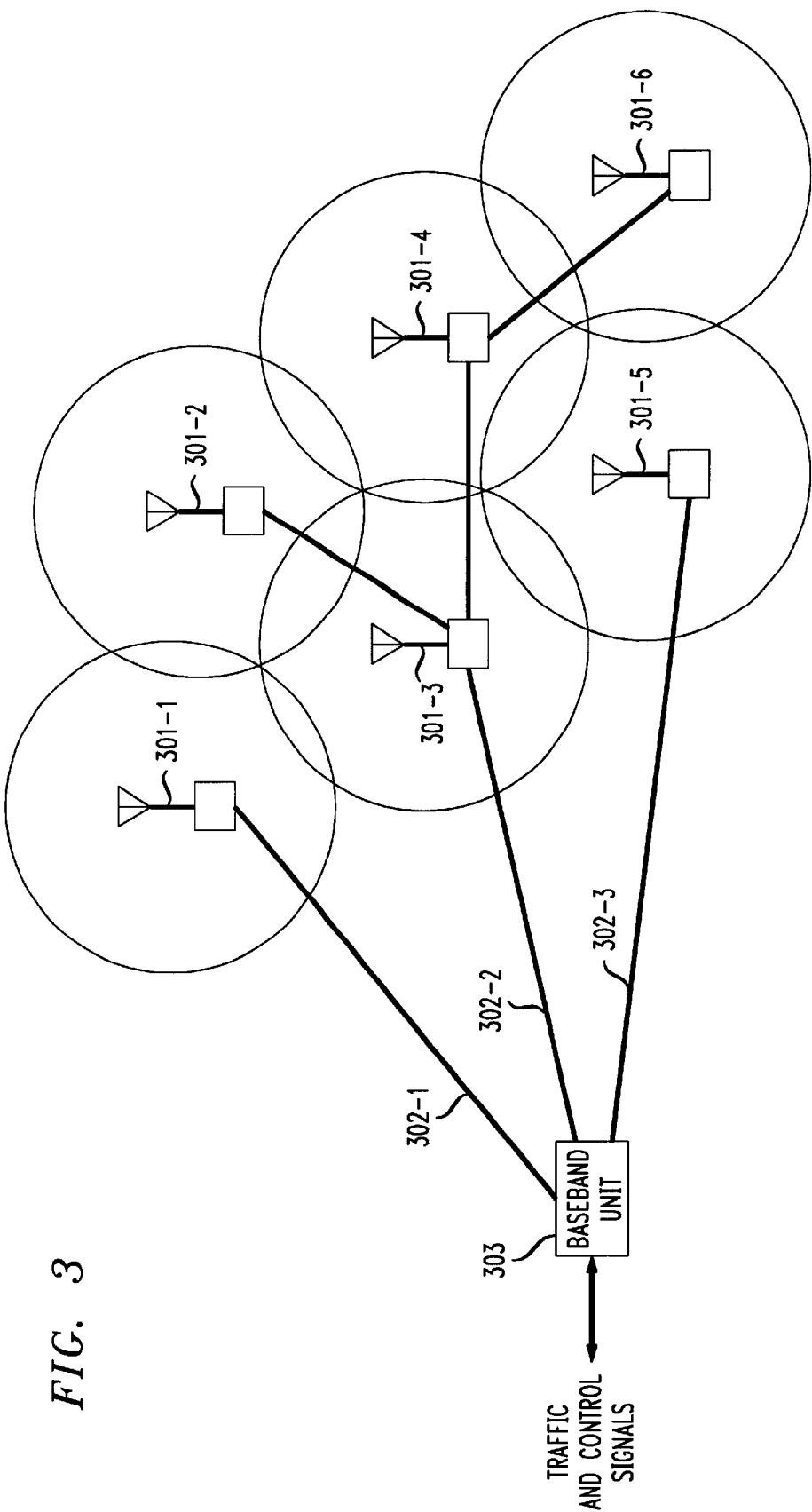
FIG. 3 depicts a schematic diagram of a wireless telecommunications system in accordance with the illustrative embodiment of the present invention.

FIG. 3 depicts a schematic diagram of the architecture of wireless telecommunications system 300, which provides wireless telecommunications service to one or more wireless terminals (not shown). It will be clear to those skilled in the art that only those aspects of a wireless telecommunications system architecture concerning the "uplink" or "reverse" channels are described in this disclosure. Those aspects of the architecture concerning the "downlink" or "forward" channel are taught in commonly-assigned co-pending U.S. patent application Ser. No. 09/023,682, entitled "A Wireless Telecommunications System Architecture Supporting Block Radio Technology," filed Feb. 13, 1998, which is incorporated by reference.

The illustrative embodiment advantageously comprises a plurality of radio heads (e.g., 301-1 through 301-7) connected to baseband unit 303 via one of wirelines 302-1, 302-2, and 302-3. In accordance with the illustrative embodiment, a radio head can be directly connected to baseband unit 303 via a unique wireline or two or more radio heads can be connected to baseband unit 303 via a shared wireline.

For the purpose of this specification, each wireless terminal transmits a traffic channel, which can include, for example, voice, data, multimedia, etc. In accordance with some access schemes (e.g., FDMA, etc.), each traffic channel is uniquely carried by a radio-frequency information-bearing signal. In contrast, some access schemes (e.g., TDMA, etc.) allow multiple wireless terminals to multiplex U traffic channels so as to create what is perceived by each radio head and baseband unit 303 as a single information-bearing signal that comprises multiplexed traffic channels.

Baseband unit 303 advantageously receives one or more information-bearing signals from each of wirelines 302-1, 302-2, and 302-3 and channel decodes, demodulates, and demultiplexes each information-bearing signal in accordance with a particular air-interface standard (e.g., GSM, IS-54 TDMA, IS-95 CDMA, etc.), in well-known fashion.

Baseband unit 303 also performs diversity combination on the information-bearing signals, in well-known fashion. The details of baseband unit 303 will be discussed below.

Each of radio heads 301-1 through 301-6 advantageously comprises: an antenna for capturing an information-bearing signal at a radio frequency, an amplifier for amplifying the information-bearing signal, a downconverter for downconverting the information-bearing signal to an intermediate frequency and a transmitter for transmitting the information-bearing signal at an intermediate frequency over a wireline to baseband unit 303. The details of radio heads 301-1 through 301-6 will be discussed below.

In accordance with the illustrative embodiment, each radio head provides wireless telecommunications service to those wireless terminals in a geographic region surrounding the radio head, which geographic region is called a cell. As depicted in FIG. 3 each cell is schematically represented by a circle that is centered at a radio head; in practice, however, each cell has an irregular shape that depends on the topography and environment surrounding the radio head.

Advantageously, the radio heads are positioned so that adjacent cells overlap and so there are no interstices or gaps in coverage. For example, as shown in FIG. 3, the cell serviced by radio head 301-1 overlaps the cells serviced by radio heads 301-2 and 301-3.

When a wireless terminal is located near a radio head, the information-bearing signal from that wireless terminal is typically received with sufficient power to be adequately received even if the receive antenna is in a fade when the signal is received.

In contrast, when a wireless terminal is located near the boundary of a cell, the information-bearing signal from that wireless terminal is typically received by receive antennas at two or more adjacent radio heads. For example, an information-bearing signal from a wireless terminal that is located within the intersection of the cells that contain radio heads 301-1 and 301-2 will typically be received by receive antennas at both radio heads 301-1 and 301-2. Although the antennas depicted in FIG. 3 are omni-directional, it will be clear to those skilled in the art how to make and use embodiments of the present invention that are directional.

Figure 4:
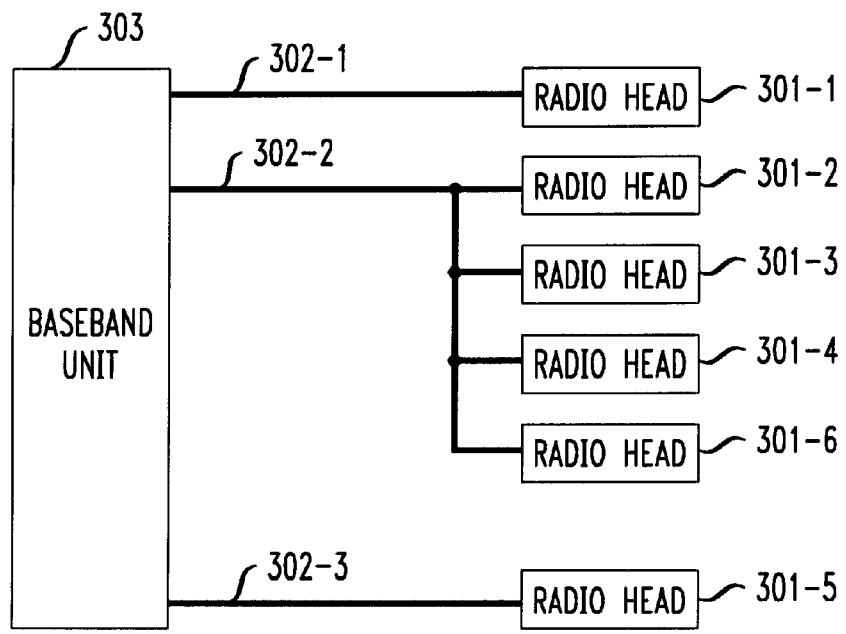
FIG. 4 depicts a block diagram of a wireless telecommunications system in accordance with the illustrative embodiment of the present invention.

FIG. 4 depicts a block diagram of the illustrative embodiment of the present invention, which advantageously comprises: six radio heads (e.g., 301-1 through 301-6) and baseband unit 303, interconnected with wirelines 302-1, 302-2 and 303-3, as shown. Wirelines 302-1, 302-2 and 303-3 are advantageously metallic twisted pair or any other cabling that is capable of carrying multiple intermediate frequency signals. It will be clear to those skilled in the art how to make and use embodiments of the present invention that have any number of radio heads that connected to baseband unit 303 via any number of wirelines.

It will be clear to those skilled in the art that baseband unit 303 can also comprise the equipment needed for supporting the downlink channels, and that wirelines 302-1, 302-2 and 303-3 can also carry downlink signals, and that radio heads 301-1 through 301-6 can comprise the equipment needed for transmitting the downlink signals.

Figure 5:
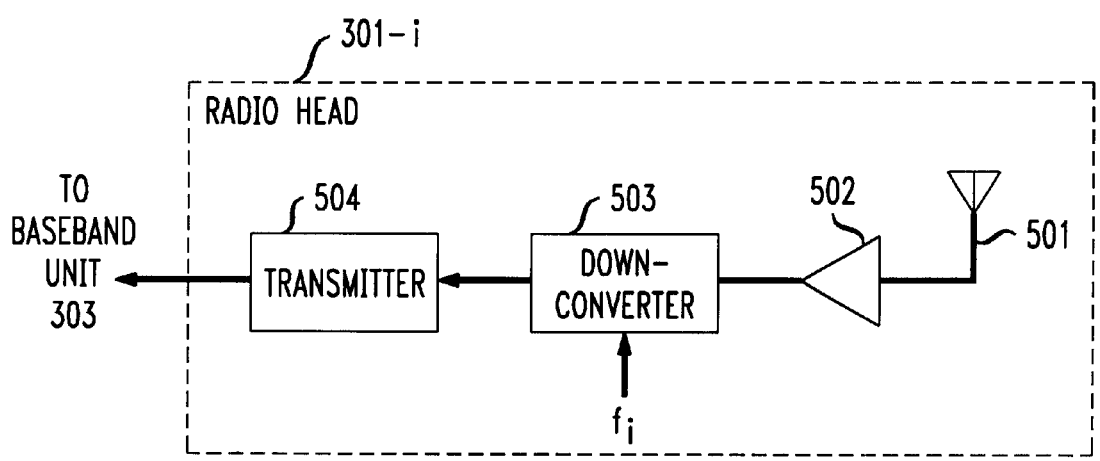
FIG. 5 depicts a block diagram of a radio head in accordance with the wireless telecommunications system of FIG. 4.

FIG. 5 depicts a block diagram of radio head 301-i in accordance with the illustrative embodiment of the present invention, which advantageously comprises: antenna 501, amplifier 502, downconverter 503, and transmitter 504, interconnected as shown.

Antenna 501 advantageously services a first geographic region that is substantially, but not completely, distinct from a second geographic region that is serviced by another antenna in another radio head. Antenna 501 advantageously receives one or more information-bearing signals from the first geographic region and other spurious signals that might or might not be associated with the wireless telecommunications system.

Amplifier 502 is advantageously a low-noise amplifier that increases the signal strength of each information-bearing signals, in well-known fashion.

Downconverter 503 advantageously down-converts each information-bearing signal to an intermediate frequency such that each information-bearing signal from each radio head can be transmitted via a wireline. When two or more radio heads share a wireline, downconverter 503 advantageously downconverts each information-bearing signal to an intermediate frequency so that each information-bearing signal can be frequency-division multiplexed over the shared wireline to baseband unit 303. As is well known to those skilled in the art, downconverter 503 can be fabricated from, for example, a mixer, a local oscillator, and a bandpass filter.

Transmitter 504 advantageously transmits each intermediate-frequency information-bearing signal over the wireline connecting radio head 301-i to baseband unit 303. When two or more radio heads share a wireline, transmitter 504 advantageously frequency-division multiplexes the intermediate-frequency information-bearing signals from the respective radios heads on the shared wireline so that they can be demultiplexed by baseband unit 303. It will be clear to those skilled in the art how to make and use transmitter 504.

Figure 6:
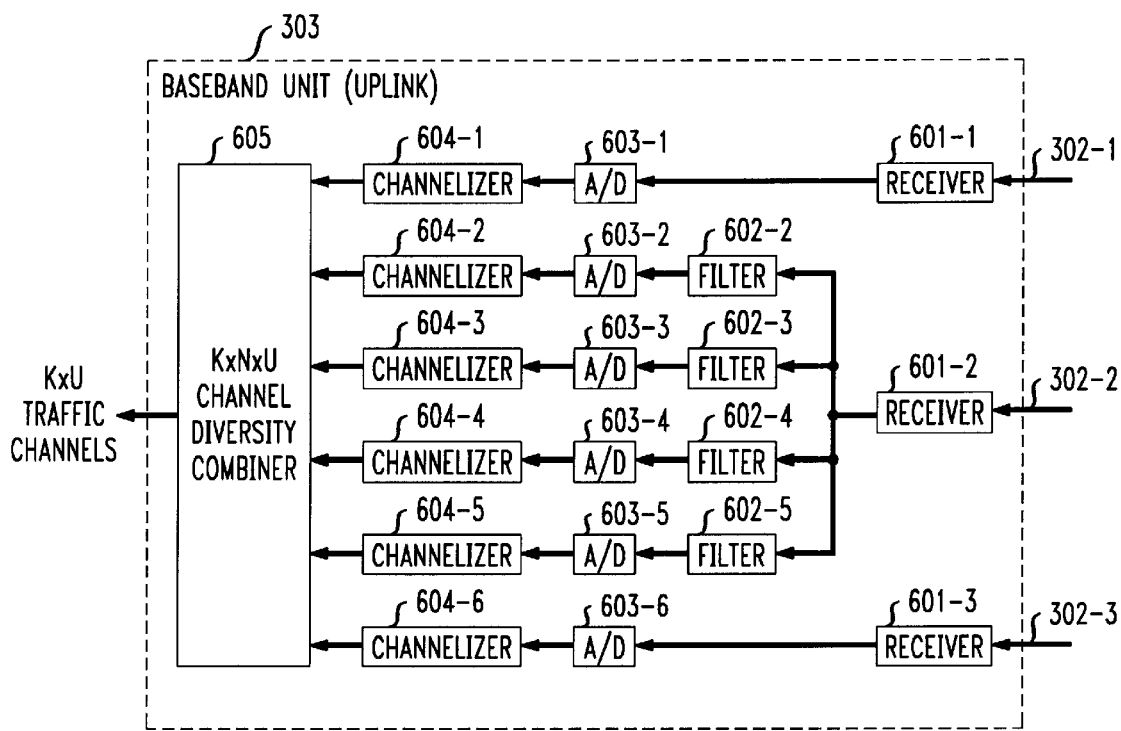
FIG. 6 depicts a block diagram of a first illustrative baseband unit in accordance with the wireless telecommunications system of FIG. 4.

FIG. 6 depicts a block diagram of a first illustrative baseband unit 303 in accordance with the illustrative embodiment of the present invention. Baseband unit 303 advantageously comprises: receivers 601-1 through 601-3, filters 602-2 through 602-5, analog-to-digital converters 603-1 through 603-6, channelizers 604-1 through 604-6, and KxNxU channel diversity combiner 605, interconnected as shown.

Baseband unit 303 advantageously receives up to K information-bearing signals from each of up to N radio heads (for a maximum of KxN information-bearing signals), wherein each information-bearing signal is multiplexed in accordance with an air-interface standard to comprise U distinct traffic channels (for a maximum of versions of KxU traffic channels). Baseband unit 303 advantageously channel decodes, demodulates, and demultiplexes each of the K information-bearing signal, in well-known fashion, and also performs up to N-way diversity combination on the up to N variations of the KxU demodulated traffic channels to create better estimates of the KxU traffic channel.

Receivers 601-1 through 601-3 provide a termination of wirelines 302-1 through 302-3 and provide the intermediate-frequency information-bearing signals on those wirelines to either an analog-to-digital converter or to a filter.

Because the illustrative embodiment in FIGS. 3 and 4 comprises six radio heads, four of which share wireline 302-2, baseband unit 303 advantageously comprises the circuitry necessary to demultiplex the intermediate-frequency information-bearing signals multiplexed onto wireline 302-2 from those radio heads. It will be clear to those skilled in the art how to make and use baseband unit 303 to support any number of radio heads and any number of wirelines.

For example, because radio heads 301-2 through 301-5 frequency-division multiplex their respective information-bearing signals to form a composite signal on wireline 302-2, wireline 302-2 is fed into bandpass filters 602-2 through 602-5, which are advantageously designed to demultiplex the intermediate-frequency information-bearing signals on wireline 302-1. For example, only those intermediate signals from radio head 301-i pass through filter 602-i. Because radio heads 301-1 and 301-6 are connected directly to baseband unit 303, each can be fed directly into an analog-to-digital converter.

Although the illustrative embodiment comprises 6 radio heads using 3 different wirelines, it will be clear to those skilled in the art how to make and use embodiments of the present invention that comprise a different number of radio heads and a different number of wirelines. It will also be clear to those skilled in the art that each frequency-division multiplexed signal needs to be isolated by a bandpass filter and it will be clear to those skilled in the art how to make and use those filters.

Analog-to-digital converters 603-1 through 603-6 each digitize an intermediate-frequency information-bearing signal with the appropriate dynamic range and sampling rate to adequately capture the signals of interest. It will be clear to those skilled in the art-how to make and use analog-to-digital converters 603-1 through 603-6.

Each of channelizers 604-1 through 604-6 is responsible for channel decoding and demodulating up to K intermediate-frequency information-bearing signals and for demultiplexing each information-bearing signal to provide estimates of up to KxU distinct traffic channels to KxNxU channel diversity combiner 605. It will be clear to those skilled in the art how to make and use channelizers 607-1 through 607-6.

KxNxU channel diversity combiner 605 advantageously receives up to KxU estimates of the distinct traffic channels from N channelizers and performs N-way diversity combining, using well-known diversity combining techniques, to produce a better estimate of the KxU distinct traffic channels. It will be clear to those skilled in the art how to make and use KxNxU channel diversity combiner 605.

Figure 7:
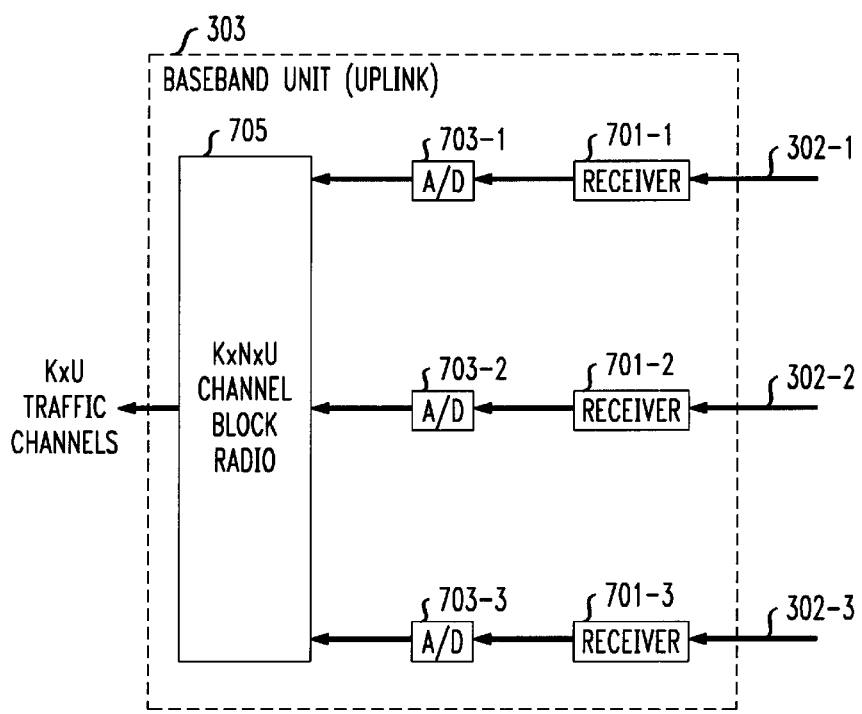
FIG. 7 depicts a block diagram of a second illustrative baseband unit in accordance with the wireless telecommunications system of FIG. 4.

FIG. 7 depicts a block diagram of a second illustrative baseband unit 303, which provides the same functionality as the first illustrative baseband unit 303, but with block radio technology. Baseband unit 303 in FIG. 7 advantageously comprises: receivers 701-1 through 701-3, analog-to-digital converter 703-1 through 703-3, and KxNxU channel block radio 705, interconnected as shown.

Receivers 701-1 through 701-3 provide a termination of wirelines 302-1 through 302-3, respectively, and provide the intermediate-frequency information-bearing signals on those wirelines to analog-to-digital converters 703-1 through 703-3, respectively.

Analog-to-digital converters 703-1 through 703-3 each digitize all of the intermediate-frequency information-bearing signals from a single wireline with the appropriate dynamic range and sampling rate to adequately capture the signals of interest. It will be clear to those skilled in the art how to make and use analog-to-digital converters 703-1 through 703-3.

Block radio 705 is advantageously a digital signal processor that is programmed to receive the digitized signals from analog-to-digital converters 703-1 through 703-3 and to produce KxU traffic channels, using digital signal processing techniques.

Block radio 705 performs the same functionality as one or more traditional radios, but has several characteristics that are different than traditional radios. First, a traditional radio processes a single information-bearing signal. In contrast, a block radio is generally capable of processing a plurality of information-bearing signals simultaneously.

Second, a traditional radio is fabricated from radio-frequency components (e.g., capacitors, inductors, oscillators, etc.) and the processing of the information-bearing signal is performed by, and is largely defined by, the electrical characteristics of the components. In contrast, a block radio principally comprises a digital signal processor and the processing of the information-bearing signals is defined by software and software parameters.

Third, a change in the characteristics of a information-bearing signal (e.g., modulation scheme, bandwidth, etc.) can be implemented in a traditional radio by changing one or more of the radio-frequency components. In contrast, a change in the characteristics of a information-bearing signal can be implemented in a block radio by changing software and/or software parameters controlling the block radio. This enables a block radio to be re-defined and upgraded remotely via a telecommunications link.

Fourth, a block radio is generally less expensive than multiple traditional radios of comparable quality and processing power.

And fifth, because a block radio processes a plurality of information-bearing signals, it is capable of performing inter-information-bearing signal processing (e.g., diversity combining, beamforming, adjacent channel interference reduction, etc.) that a traditional radio, which sees only one information-bearing signal, is incapable of performing.

Block radio 705 advantageously: (1) frequency-division demultiplexes each intermediate-frequency information-bearing signal from a shared wireline, (2) channel decodes and demodulates up to K intermediate-frequency information-bearing signals, (3) demultiplexes each information-bearing signal to provide estimates of up to KxU distinct traffic channels, and (4) performs N-way diversity combining, using well-known diversity combining techniques, to produce a better estimate of the KxU distinct traffic channels. It will be clear to those skilled in the art how to make and use block radio 705.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. An apparatus comprising:
   a first antenna for receiving a first information-bearing signal at a first radio frequency;
   a first downconverter for downconverting said first information-bearing signal to a first intermediate frequency;
   a first transmitter for transmitting said first information-bearing signal at said first intermediate frequency over a first wireline, wherein said first wireline is twisted-pair;
   means for receiving said first information-bearing signal at said first intermediate frequency from said first wireline and for demodulating said first information-bearing signal.

2. The apparatus of claim 1 further comprising:
   a second antenna for receiving a second information-bearing signal at a second radio frequency;
   a second downconverter for downconverting said second information-bearing signal to a second intermediate frequency;
   a second transmitter for transmitting said second information-bearing signal at said second intermediate frequency over said first wireline;
   means for receiving said second information-bearing signal at said second intermediate frequency from said first wireline and for demodulating said second information-bearing signal.

3. The apparatus of claim 2 further comprising means for diversity combining said first information-bearing signal and said second information bearing signal.

4. The apparatus of claim 2 wherein said first transmitter and second transmitter frequency-division multiplex said first information-bearing signal at said first intermediate frequency and said second information-bearing signal at said second intermediate frequency over said first wireline.

5. The apparatus of claim 1 further comprising:
a second antenna for receiving a second information-bearing signal at a second radio frequency;
a second downconverter for downconverting said second information-bearing signal to a second intermediate frequency;
a second transmitter for transmitting said second information-bearing signal at said second intermediate frequency over a second wireline;
means for receiving said second information-bearing signal at said second intermediate frequency from said first second and for demodulating said second information-bearing signal.

6. The apparatus of claim 5 further comprising means for diversity combining said first information-bearing signal and said second information bearing signal.

7. A method comprising:
receiving a first information-bearing signal at a first radio frequency with a first antenna;
downconverting said first information-bearing signal to a first intermediate frequency with a first downconverter;
transmitting said first information-bearing signal at said first intermediate frequency over a first wireline, wherein said first wireline is twisted-pair;
receiving said first information-bearing signal at said first intermediate frequency from said first wireline; and
demodulating said first information-bearing signal.

8. The method of claim 7 further comprising:
receiving a second information-bearing signal at a second radio frequency with a second antenna;
downconverting said second information-bearing signal to a second intermediate frequency with a second downconverter;
transmitting said second information-bearing signal at said second intermediate frequency over said first wireline;
receiving said second information-bearing signal at said second intermediate frequency from said first wireline; and
demodulating said second information-bearing signal.

9. The method of claim 8 further comprising diversity combining said first information-bearing signal and said second information bearing signal.

10. The method of claim 8 further comprising frequency-division multiplexing said first information-bearing signal at said first intermediate frequency and said second information-bearing signal at said second intermediate frequency over said first wireline.

11. The method of claim 7 further comprising:
receiving a second information-bearing signal at a second radio frequency with a second antenna;
downconverting said second information-bearing signal to a second intermediate frequency with a second downconverter;
transmitting said second information-bearing signal at said second intermediate frequency over a second wireline;
receiving said second information-bearing signal at said second intermediate frequency from said second wireline; and
demodulating said second information-bearing signal.

12. The method of claim 11 further comprising diversity combining said first information-bearing signal and said second information bearing signal.

13. An apparatus comprising:
(1) a first antenna head comprising:
(a) a first antenna for receiving a first information-bearing signal at a first radio frequency,
(b) a first downconverter for downconverting said first information-bearing signal to a first intermediate frequency, and
(c) a first transmitter for transmitting said first information-bearing signal at said first intermediate frequency over a first wireline, wherein said first wireline is twisted-pair;
(2) a baseband unit comprising:
(a) means for receiving said first information-bearing signal at said first intermediate frequency from said first wireline, and
(b) means for demodulating said first information-bearing signal.

14. The apparatus of claim 13 further comprising:
(3) a second antenna head comprising:
(a) a second antenna for receiving a second information-bearing signal at a second radio frequency,
(b) a second downconverter for downconverting said second information-bearing signal to a second intermediate frequency, and
(c) a second transmitter for transmitting said second information-bearing signal at said second intermediate frequency over said first wireline; wherein said (2) baseband unit further comprises:
(c) means for receiving said second information-bearing signal at said second intermediate frequency from said first wireline, and
(d) means for demodulating said second information-bearing signal.

15. An apparatus comprising:
a first antenna at a first radio head for receiving a first information-bearing signal at a first radio frequency;
a first downconverter for downconverting said first information-bearing signal to a first intermediate frequency;
a first transmitter at said first radio head for transmitting said first information-bearing signal at said first intermediate frequency over a first wireline, wherein said first wireline is twisted-pair;
a second antenna at a second radio head for receiving a second information-bearing signal at a second radio frequency;
a second downconverter for downconverting said second information-bearing signal to a second intermediate frequency;
a second transmitter at said second radio head for transmitting said second information-bearing signal at said second intermediate frequency over said first wireline;
means for receiving said first information-bearing signal and said second information-bearing signal from said first wireline; and
means for diversity combining said first information-bearing signal and said second information-bearing signal.

16. The apparatus of claim 15 further comprising means for isolating said first information-bearing signal from said second information-bearing signal.

17. A method comprising:

receiving a first information-bearing signal at a first radio frequency with a first antenna at a first radio head;

downconverting said first information-bearing signal to a first intermediate frequency;

transmitting said first information-bearing signal at said first intermediate frequency over a first wireline, wherein said first wireline is twisted-pair;

receiving a second information-bearing signal at a second radio frequency with a second antenna at a second radio head;

downconverting said second information-bearing signal to a second intermediate frequency;

transmitting said second information-bearing signal at said second intermediate frequency over said first wireline;

receiving said first information-bearing signal and said second information-bearing signal from said first wireline; and diversity combining said first information-bearing signal and said second information-bearing signal.

18. The method of claim 17 further comprising isolating said first information-bearing signal from said second information-bearing signal.

* * * * *